(12) United States Patent
Barnhart

(10) Patent No.: US 9,993,973 B1
(45) Date of Patent: Jun. 12, 2018

(54) METHOD USING A MOBILIZED 3D PRINTER

(71) Applicant: Kenneth J. Barnhart, San Francisco, CA (US)

(72) Inventor: Kenneth J. Barnhart, San Francisco, CA (US)

(*) Notice: Subject to any disclaimer, the term of this patent is extended or adjusted under 35 U.S.C. 154(b) by 771 days.

(21) Appl. No.: 14/477,782

(22) Filed: Sep. 4, 2014

(51) Int. Cl.
*B29C 64/10* (2017.01)
*B29C 67/00* (2017.01)

(52) U.S. Cl.
CPC .......... *B29C 67/0051* (2013.01); *B29C 64/10* (2017.08)

(58) Field of Classification Search
CPC .............................. B29B 11/16; B29B 15/105
See application file for complete search history.

(56) References Cited

U.S. PATENT DOCUMENTS

| | | | |
|---|---|---|---|
| 5,768,137 A | 6/1998 | Polidoro et al. | |
| 6,375,874 B1 | 4/2002 | Russell et al. | |
| 6,416,850 B1 | 7/2002 | Bredt et al. | |
| 2003/0063138 A1* | 4/2003 | Varnon | B29C 67/0092 347/1 |
| 2005/0280185 A1* | 12/2005 | Russell | B28B 1/001 264/308 |
| 2006/0196376 A1* | 9/2006 | Piazza | B65G 49/061 101/477 |
| 2009/0051062 A1* | 2/2009 | Wilkinson | B29C 47/02 264/32 |
| 2012/0038074 A1* | 2/2012 | Khoshnevis | B29C 67/0055 264/34 |
| 2013/0309121 A1 | 11/2013 | Prest et al. | |

* cited by examiner

*Primary Examiner* — Jeffrey Wollschlager
*Assistant Examiner* — Armand Melendez
(74) *Attorney, Agent, or Firm* — Thomas M. Freiburger

(57) ABSTRACT

A novel 3D printing technique is used to mobilize a 3D printer while printing thus creating an unlimited build volume. The 3D printer is mobilized by printing track or scaffold that guides the 3D printer as it moves in a spiral or helical, corkscrew, or linear fashion. After printing a segment the printer subsequently utilizes the track or scaffold printed during the process, after the material has set to the desired or specified hardness, for advancement and support of the printer.

6 Claims, 5 Drawing Sheets

METHOD USING A MOBILIZED 3D PRINTER

BACKGROUND OF THE INVENTION

This invention generally relates to the manufacture of objects utilizing three-dimensional (3D) printing methods, and more particularly to the use of a printed scaffold or track to mobilize the 3D printing apparatus being used. Existing 3D printing technologies may implement this method and apparatus to create an unlimited build volume.

The breadth of 3D printing technology applications is currently being explored by many industries. Presently different methods of 3D printing are under experimentation. Examples of a couple different 3D printing methods are thermoplastic extrusion, binder jetting, selective laser melting for metal and glass, and liquid metal jet printing.

3D printer build volume is presently limited to the space within a 3D printer that is reachable by the printer head(s), defined herein as the "local build volume" or "localized build volume". The scalability of this build volume is highly dependent on the supporting apparatus and infrastructure.

Reference is made to the following prior art as pertinent to this invention: U.S. Pat. Nos. 6,375,874, 6,416,850, 5,768,137; U.S. 2013/0309121; Faro Technologies Inc. (Laser Tracking, i.e. Total Station); Trimble (Robotic Leveling).

SUMMARY OF THE INVENTION

In the method of the invention the 3D printer is mobilized by apparatus that connects the printer to scaffold or track herein referred to as the track. The track that the printer moves along is printed by the 3D printer as part of each segment produced by the printer, or the track can be produced by assisting 3D printers whose sole responsibility is to print track or guideway while a primary printer(s) takes care of the rest of the build. When using this method, a track is printed allowing the printer to move throughout the 3D printing process, herein referred to as the "build". While the printer is stationary, the volume being printed before the next movement will be referred to as the localized build, or a "segment" being built.

The localized build volume references the volume of printable area when the printer being mobilized remains stationary. The total build volume (in the current context) is defined by the volume of the smallest possible imaginary three dimensional rectangular solid capable of encapsulating the completed build with all sides being tangent to (or touching) the build limits.

The track followed by the mobilized printer may be of different forms or formats. Primarily the importance of the track is that it is 3D printed, so that the printer apparatus advances along supported by the structure it is printing. The equipment used to mobilize the printer(s) may have joints in the frame to allow the printer to move along a curve track or corners, or the frame for print head movement can be wider than a normal build segment so as to permit curves or angles to be built at one or both sides left or right, which will enable building lateral elements or changing direction. The printer(s) on board may use different methods and materials. If multiple materials or methods are to be employed for the same build it is assumed an engineering solution can be implemented to successfully interface the different materials in use, well within the skill of one skilled in the art of 3D printer technology.

Automated surveying equipment may be utilized to allow the printer to constantly stay correctly positioned while monitoring real-time position along all three axes, commonly referred to as X, Y, and Z (R, e coordinates could also be used). Equipment will be utilized to allow for the printer to adjust along any axis to correct for any offsets calculated by the automated surveying equipment. This equipment will reference control points established before commencement of the build. New control points may be established during the build if sightlines to initial control points are obstructed. These control points may be established apart from the object being printed, upon the object, or as part of the object depending on the structural qualities of the material being used and printing conditions.

When considering a large or unlimited build volume, supporting infrastructure comes into question. Examples of supporting infrastructure are power supply and print material supply. A solution to the method of raw material supply is one in which one or more supply material conduits are integrally formed with the build. Such a conduit(s), or a separate, flexible conduit, can be used to transfer raw material from the ground level to the printer hopper, via a pump if needed. If the mobilized printer were to be ultimately wireless then an onboard battery(s) could be used to store energy produced from onboard solar energy, or wind energy harvesting equipment, i.e. photovoltaic cells or wind turbines. Other onboard (if wireless) equipment could be used to communicate with the computer being used to program and/or transmit the printer's movements which may be communicated to the mobilization equipment and printer through existing robotic encoding equipment.

It is important to note that repetitive movement around the perimeter of a shape is not essential to the implementation of this method, but only employed in a preferred embodiment of the method. The articulation range and other specifications of the printer itself help dictate the best direction, speed, and technique to mobilize. These and other objects, advantages and features of the invention will be apparent from the following description of a preferred embodiment, considered along with the accompanying drawings.

DESCRIPTION OF PREFERRED EMBODIMENTS

Figure 1:
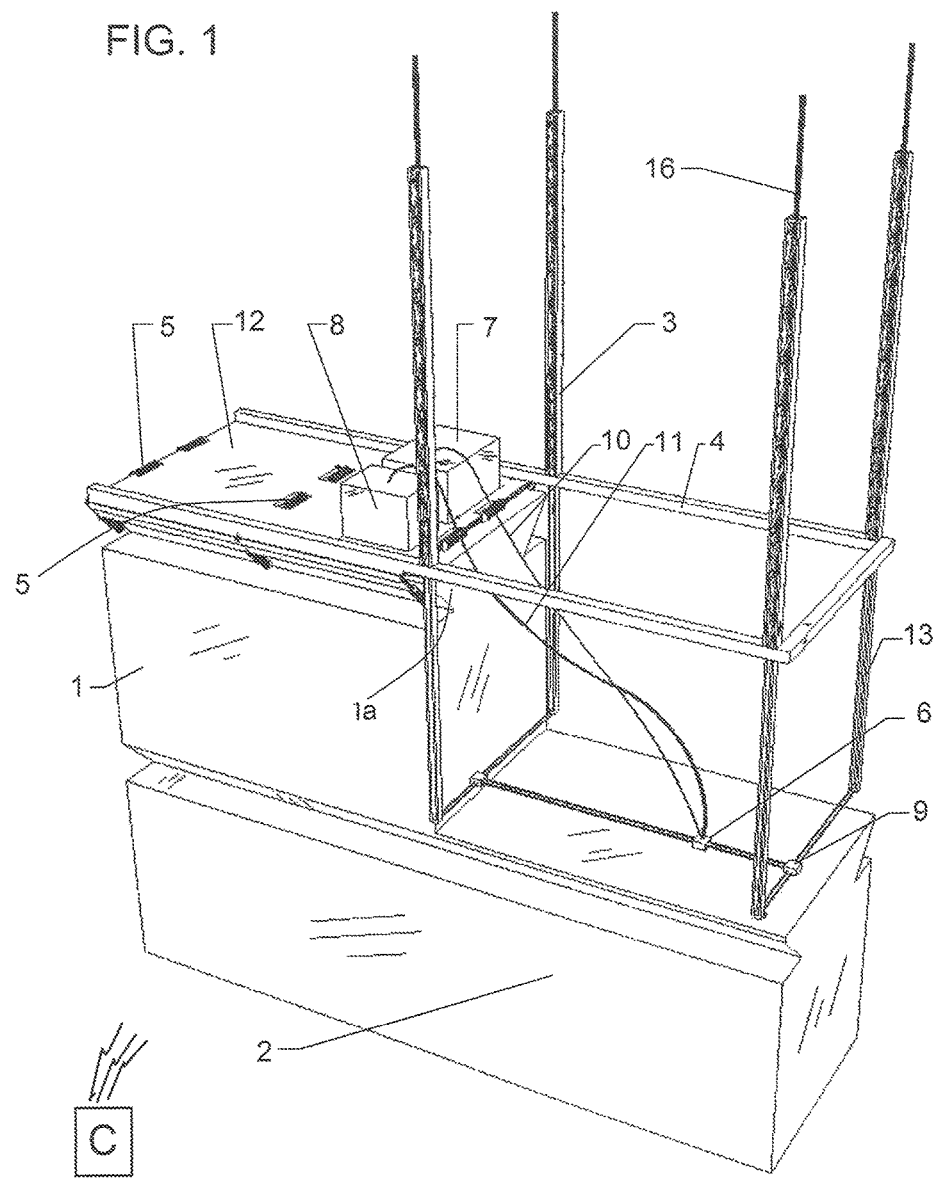
FIG. 1 is an isometric view of a horizontal configuration of the method.

Reference numbers in the drawings represent elements of the invention as follows:

1. A previously printed segment supporting the mobilization unit.
   1a. An integral track or monorail printed with the previous printed segment.
2. Material printed on a previous pass of this method and now acting as the base for the current pass.
3. Stationary portion of the vertical towers attached to the cantilevered portion of the gantry 3D printing system.

4. Cantilevered beams supporting the gantry 3D printer and acting as the primary connection the body of the mobilization unit and the gantry style printing apparatuses.
5. Wheels, rollers, or gears allowing the mobilization unit to move along the track during progression from one segment to the next.
6. Device that deposits the material(s) being printed, herein referred to as the print head. In this configuration the print head is attached to a module that allows it to move in the X or Z direction with the axes being traditionally oriented.
7. This is a hopper to store raw printing material. This could also be replaced with a filament spool or other raw material storage unit appropriate for the material being printed.
8. Computer unit to send data to either the print head(s), primary computer, or both.
9. Module to move the printing head support rails in the X or Z direction with the axes being traditionally oriented. It's assumed that the power and data feed could be integrated to the support rails in this configuration.
10. Conduit to deliver the raw material to the print head to be deposited on the build.
11. Conduit carrying the data cables to allow a computer unit to communicate with the printer head and/or other modules responsible for moving the printer head in any or all directions of the Cartesian coordinates X,Y,Z.
12. Body or platform of the mobilization unit. This portion is meant to connect or support all integral parts to the mobilization of the local build volume.
13. Movable portion of the vertical towers. There are an equal number of these components as there are stationary towers 3.
14. Adjustment unit used to tighten the body of the mobilization unit to the previously printed segment allowing wheels, rollers, or gears 5 to gain friction and move the unit from one segment to the next.
15. Stationary struts to support all equipment above the print surface.
15a. Support structure.
16. Rod connected to the top of the movable portion of the vertical strut 13 used as a connection point to the device that moves the rod, therefore moveable vertical strut, upward and downward.

Figure 2:
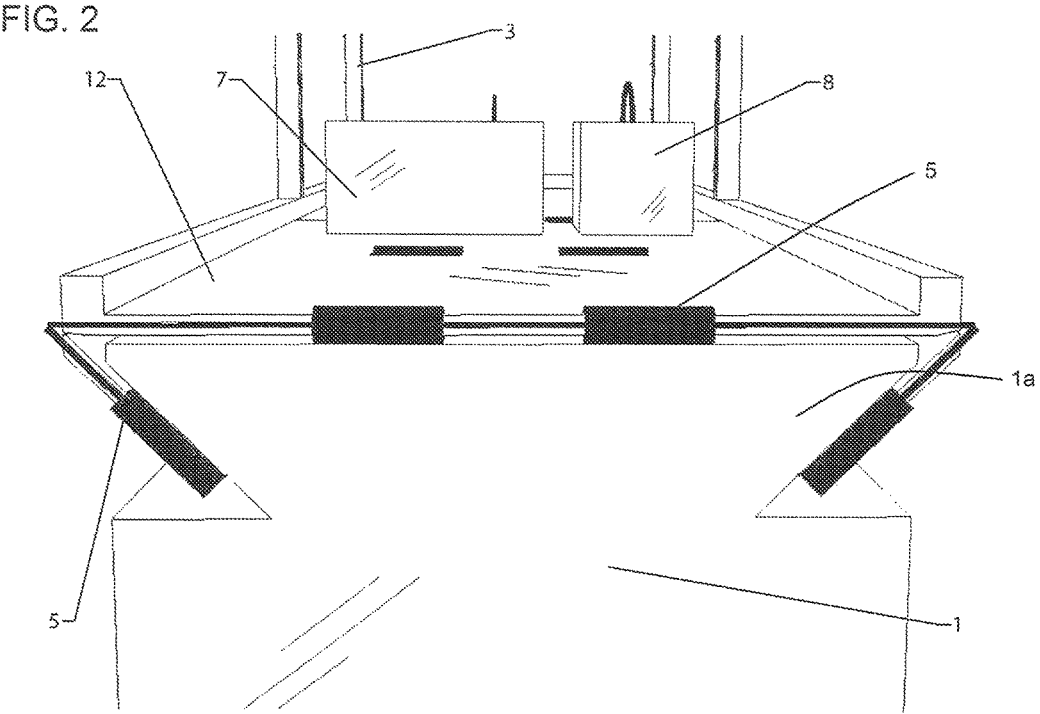
FIG. 2 is an isometric view showing a cross section from the rear (with respect to the direction of movement) of an apparatus implementing the method horizontally.
Figure 3:
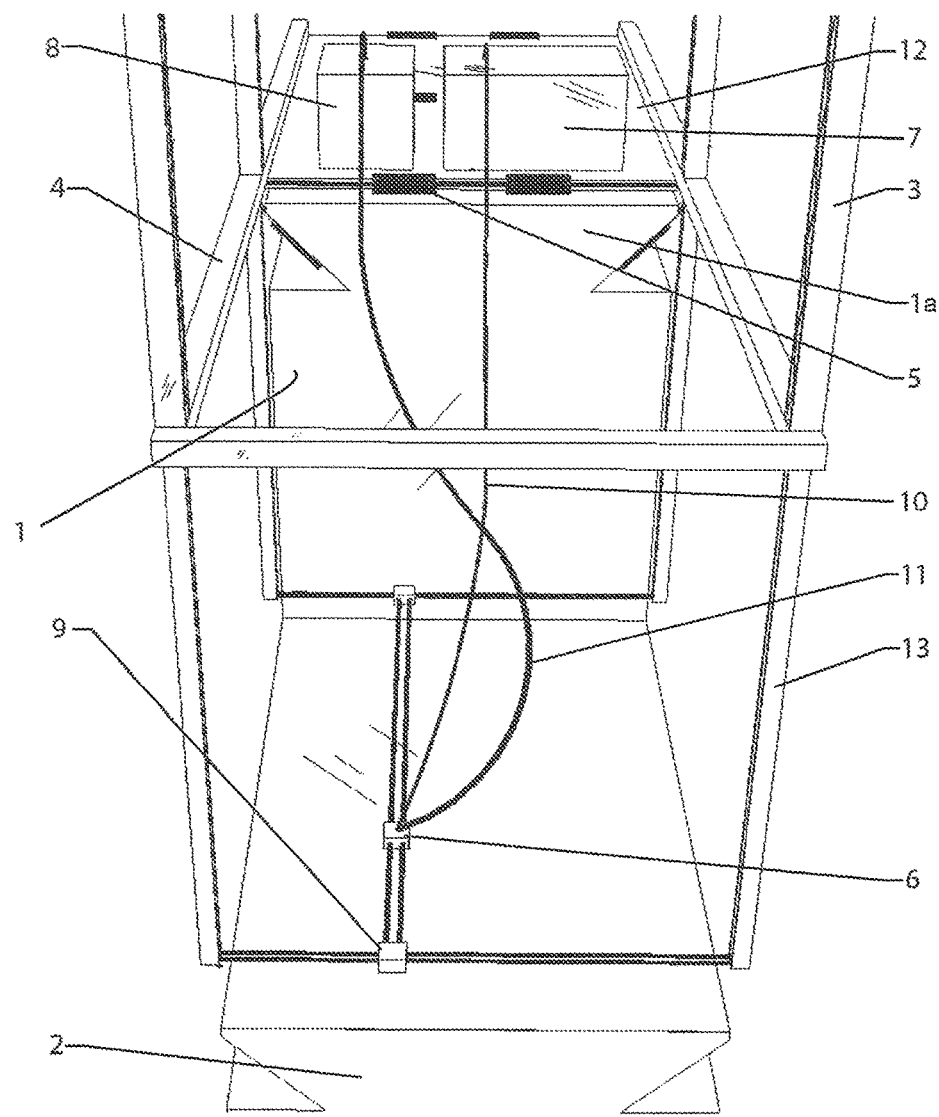
FIG. 3 is an isometric view showing a cross section from the leading side of an apparatus implementing the method horizontally.

FIGS. 1 to 3 illustrate an embodiment of the invention, the method as well as an example of apparatus. FIGS. 1 and 2 show, in a cross sectional or end view, a segment 1 of structure built or being built by a 3D printer apparatus, as well as the 3D printer apparatus itself. The structure being built includes a track or guideway 1*a* used to guide the printing apparatus, this track being printed throughout the build, along with segments of the structure itself. The track can also be referred to as a monorail, and it could be a narrower rail formed as the upper part of the segment. Alternatively, the track could comprise multiple rails, e.g. two parallel rails. The terms track or guideway encompass any of these forms and others, such as one or more grooves.

The embodiment of FIGS. 1-3 shows the method being implemented in horizontal manner. The method is carried out by printing the required structure within the localized build volume allowing the body or platform 12 of the mobilized 3D printer to move forward to the next segment. To guide the mobilized printer, the track or guideway 1*a* is printed as part of the build to subsequently be used to guide the mobilized printer to the next segment. The printer head 6 deposits the material while the mobilizing apparatus is stationary. This printer head moves move in any of the Cartesian coordinate directions of XYZ by utilizing onboard equipment. Gantry towers, comprised of moveable vertical portions 13 and 16 and stationary vertical portions 3, allow the printer head and the plane on which the printer is printing to be moved in the vertical Y axis direction. Modules 9 that support rod(s) carrying the printer head 6 allow the printer head to move in the Z axis direction. The printer head 6 is connected to or part of another module also indicated at 6 that allows the printer head to move in the X axis direction along the support rails. Servo motors (not shown) effect all these desired movements, as well known by 3D printing engineers.

The mobilizing apparatus is comprised of the platform or body 12, wheels rollers or gears 5 that interface with the previously printed segment 1, and cantilevered beams 4 supporting the gantry style 3D printer. Again, these rollers are driven by servo motors (not shown). The body 12 supports ancillary devices to support the printing operation, including a raw material hopper 7 and computer 8 that are carried along with the mobilized printer from one segment to the next. Conduits 10 and 11 help the ancillary devices deliver and/or receive data, and deliver raw print material to the print head. A primary computer or microprocessor is shown at C in FIG. 1, preferably stationary and carrying in memory the overall plan for the structure being built. The microprocessor C is connected to the onboard computer 8 by wire or wirelessly.

When printing one segment the print head 6 starts at a predetermined location upon the material segment 2 printed during a prior pass. In context of the invention a pass is defined as the completion of all steps or cycles required to allow the method to successfully be implemented by repeating such steps or cycles to progress the build. When a segment is completed with an integrated track which the wheels, rollers, or gears 5 may follow, the mobilization unit progresses to the next build location where the body or platform 12 will be located above the segment of printed material 1 previously completed. A cycle can be considered a complete pass of the length of an entire wall, or traversal of a full 360° of one level of a round or generally rectangular building structure (which may be a helical build), for example.

Figure 4:
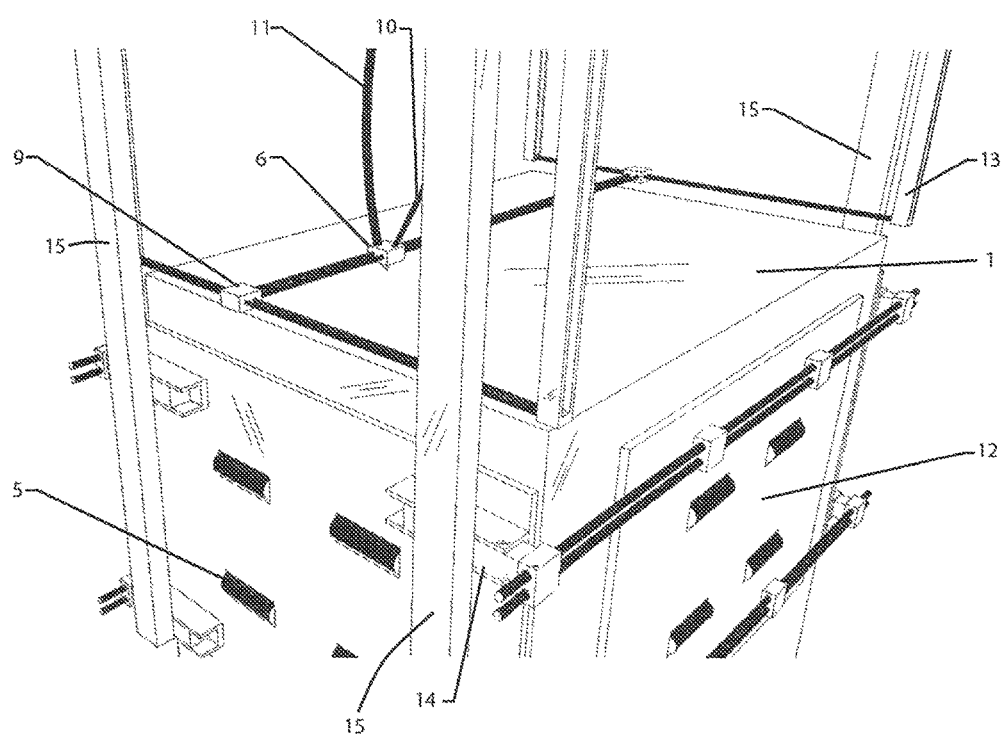
FIG. 4 is an isometric view showing a vertical configuration of the method.
Figure 5:
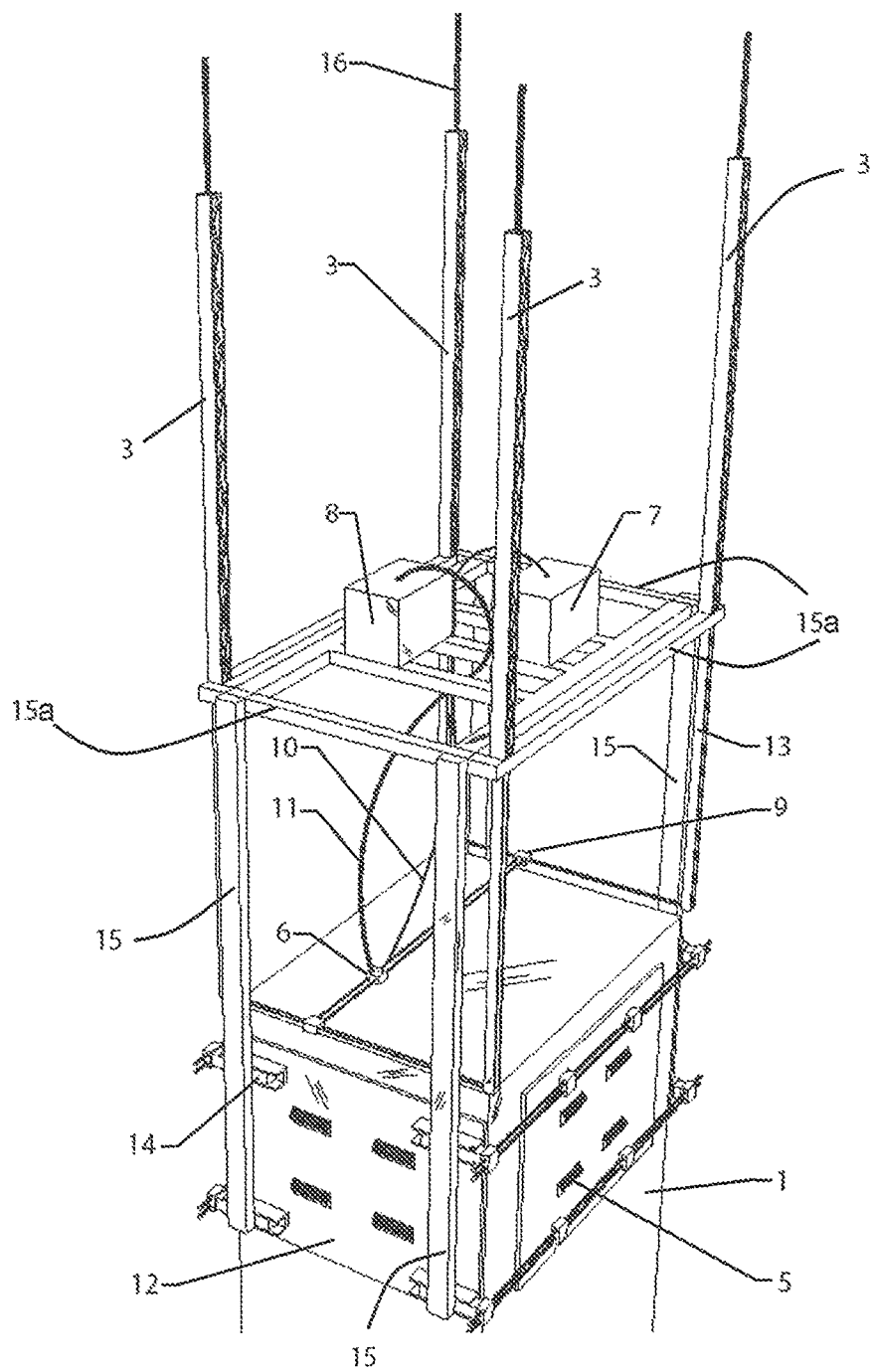
FIG. 5 is a zoomed isometric view showing a vertical configuration of the method.

FIGS. 4 and 5 depict an embodiment wherein the method being implemented in a vertical manner and the mobilization apparatus advances in the Y axis direction, i.e. upward.

Vertical struts 15 support structure 15*a* holding the ancillary print devices 7 and 8 and also connected to the stationary towers or guides 3. The stationary towers 3 are connected to vertically movable members 13 by way of connecter rods 16. The moveable part 13 of the tower slides inside the stationary part 3. When the moveable parts 13 of the towers are fully retracted up into the towers 3, the connector rods extend almost completely out of the tops of the towers and the interface of the moveable parts 13 of the towers and the connector rods 16 are then located at the top of the stationary part 3 of the tower. When the moveable parts 13 of the towers are fully extended (downward, as shown), the interface between the connector rods 16 and the moveable parts 13 is near the bottom of the stationary towers 3.

An angle may be applied to the direction of print for the embodiments described above by including joints or various articulating parts within the tower support structures 3, 13, 16, 4, 15, 15*a* of FIGS. 1-3 or of FIGS. 4-5, or at the bottom of the moveable part 13 of the tower at the interface with the support rods. This modifications would allow the elevation at the bottom of each moveable part of the tower to be different allowing the plane on which is being printed to be changed to meet the requirements of the build. Another way to allow for turns in the horizontal mode of FIGS. 1-3 or lateral variations in the structure is to make the frame for the print head volume wider than the actual segment width, to allow for forming curves or corners of a structure, or for forming flare-outs where desired.

The shaking and vibration caused by the rapid movement of the printer head may be mitigated by implementing an engineering solution. For example the mass of the printer frame and platform and carried components, and the stiffness of the components, can be made sufficient to stabilize the printer head as head position changes are made.

Walls can be produced using the method and system of the invention, and this can include a structure with a continuous enclosure of walls, whether round, rectangular, hexagonal or other shapes. For such a continuous build around the perimeter, the build can be spiral, i.e. helical. Thus, for each cycle around the perimeter, the build will be one level higher. A foundation for the structure can be laid to provide for this, so that the build progresses to the next level after completion of a first cycle or circuit.

Also, the walls or columns built according to the invention need not be of solid material but could be formed of three-dimensional webs that are structurally rigid but consume far less material.

The utility of the method is based on the concept that the 3D printer itself moves, advancing through a pattern to form a desired structure and as that structure is formed, the structure is used to support and mobilize the 3D printer, which is progressively advanced to meet the needs of the localized build volume which relocates throughout the build.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

I claim:

1. A method for building a structure using a 3D printer, comprising, advancing the entire 3D printer, including a 3D print head, a print material supply container, a conduit from the supply container to the print head, a processor to control the print head for movement on three axes, and 3D print head movement rails, through a pattern to form a desired structure segment by segment, and as the structure is formed, using the structure to support the 3D printer such that the 3D printer is progressively and incrementally advanced, segment by segment, to build and then be advanced and guided along a just-built segment of the structure to a new stationary position at which the 3D printer produces, ahead of the just-built segment, another segment of the same layer of the structure, and such that the 3D printer is successively relocated throughout the building of the structure, being advanced repeatedly around the perimeter of the structure in an essentially helical configuration.

2. The method of claim 1, including providing supply of print material at the print head via a conduit leading to the print head from a print material storage tank which is not onboard the 3D printer.

3. The method of claim 1, wherein the 3D printer includes a framework with a platform configured to slidingly advance on the just-built segment, on a track or guideway formed in the just-built segment by the 3D printer, the print head supported in the framework and movable relative to the framework by servo motors in three-dimensional space, and with the framework supporting the print head within a local build volume just ahead, the platform being engaged with the track or guideway.

4. The method of claim 3, wherein the platform of the framework includes drive rollers to provide motorized movement to advance the 3D printer along the track or guideway, for said advancing step.

5. The method of claim 1, wherein the advancement of the 3D printer is in a generally horizontal direction, and including forming a track or guideway in each segment as the segment is produced, the track or guideway comprising a generally horizontal top surface on each segment with an undercut at left and right sides, and wherein the 3D printer includes a framework with a platform that engages the top surface and also the left and right undercut surfaces of the track or guideway to stably retain the platform on the track or guideway.

6. The method of claim 1, further including causing the 3D printer, as it produces a segment of the structure, to produce a track or guideway integrally in the segment being produced, the track or guideway being configured to be gripped by structure of the 3D printer for stable sliding movement along the track or guideway when the 3D printer is advanced.

* * * * *